Dec. 5, 1939.   E. F. BACON   2,181,960
ELECTRIC GAUGE
Filed Dec. 20, 1937

Inventor
Elbridge F. Bacon
By Blackmore, Spencer & Flint
Attorneys

Patented Dec. 5, 1939

2,181,960

UNITED STATES PATENT OFFICE 2,181,960

ELECTRIC GAUGE

Elbridge F. Bacon, Flint, Mich., assignor to General Motors Corporation, Detroit, Mich., a corporation of Delaware Application December 20, 1937, Serial No. 180,718

6 Claims. (Cl. 171—95)

This invention relates to electric gauges and is concerned particularly with a modification of gauges of the prior art whereby the gauge is made readily adaptable to installation in a system for indicating the temperature of the water cooling system of an internal combustion engine.

In some gauges of the prior art the instrument is used to determine the liquid level in a reservoir, specifically, the gasoline tank of an automobile. In the gauges in question, using two coils or electromagnets, the variable tank unit resistance is in parallel with the right hand coil. At the tank-empty position this resistance is zero and the right hand coil is therefore short circuited. The left hand coil alone is active and the armature on the pointer shaft is held with its axis parallel to the left hand coil axis. As the gasoline level in the tank rises the resistance is increased and the right hand coil becomes progressively stronger until at the tank-full position the right hand coil is of such strength that the armature is pulled nearer into parallelism with the coil axis and the pointer is caused to rotate to the "full" position on the dial of the gauge. For practical reasons the coils are placed with their axes at an angle of about 90°, and the pointer rotation is limited to about 60°. Greater angular displacement of the coils or greater angles of pointer rotation cause erratic pointer movements and distorted scales.

It is obvious that the tank unit resistance may be replaced by some material which varies its resistance with temperature changes and this material, suitably encased, if necessary, may be exposed to the water cooling system of an internal combustion engine. Suitable calibration of the gauge could then be made in temperature degrees. The practical drawback to such a device is the resistance present at the lowest temperature to be measured. Thus, if nickel wire were to be used, its resistance might vary between, say, 25 ohms at 100° F. and 40 ohms at 212° F. The starting position of the pointer would then be at about two-thirds the scale and the total movement would be limited to approximately one-third the scale.

The purpose of this invention is to balance the magnetic circuit in such a way that the effect of this initial resistance at the starting temperature is nullified and the pointer starts at an apparent zero resistance. This permits the pointer to have the full 60° scale movement. The neutralizing of the initial field in the right hand coil is accomplished by a reversed winding on the coil or by an additional reverse coil on the end of the regular right hand coil. Two variations are shown on the accompanying drawing.

On the drawing

Figure 4:
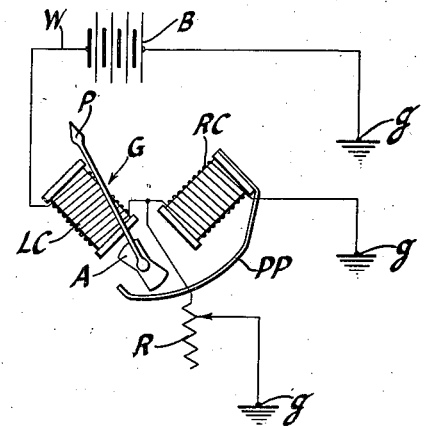
Figure 4 is the circuit of the prior art gauge.

Referring to the drawing, Figure 4 shows the circuit of the prior art gauge or differential galvanometer. The battery is indicated at B, and W is a wire from the battery to the gauge G, which has a right hand coil RC and a left hand coil LC. The variable resistance is indicated at R, the pointer at P, and the armature at A. PP indicates an iron pole piece to concentrate the flux. The various ground connections are indicated at g.

In Figure 4, the right hand coil RC and the resistance R are in parallel with the left hand coil LC. All the current passes through LC all the time and when the resistance R is zero, the coil RC is short circuited to cause the pointer P to assume the zero position as shown. As the resistance R increases, more current will pass through the coil RC and less through the resistance to cause the field about coil RC to increase. This increase in field strength will cause the armature to move into greater alignment with the coil RC.

The resistance R corresponds to the resistance at the gasoline tank of an automobile, this resistance being varied according to the change in level of the gasoline in the tank, the resistance being zero when the tank is full and maximum when the tank is empty.

The new gauge is indicated as a whole at 2. The gauge has the left hand electromagnet or coil 4 and the right hand electromagnet or coil 6. The pointer is indicated at 8, being pivotally mounted at 10 and having the soft iron armature 12 rigidly secured on its shaft. The electromagnets 4 and 6 are energized from the battery 14 having a wire 16 leading to a common terminal 18 to which the ends of the coils 4 and 6 are connected.

The right hand coil 6 is different from the corresponding coil of the prior art in that it has two windings 24 and 26 which are opposed to each other. The winding 24 is connected to ground as indicated at 27 while the winding 26 is connected directly to ground 28, Figures 2 and 3. If it were not for the opposed windings 24 and 26 of the magnet 6, the initial strength of the magnet 6 would be sufficiently great to cause the pointer 8 to be substantially at mid-position. When the resistance 28 is at a minimum, the strength of the field of the coil 6 is zero due to the opposed windings 24 and 26, thereby enabling the coil 4 to pull the armature 12 and the pointer 8 to the zero scale position at the extreme left, the position shown in Figures 1, 2, and 3.

The variable resistance 28 corresponds to the engine unit of a thermoelectric system, the resistance of the unit 28 varying with the temperature, being greater for higher temperatures, so that as the heat of the engine increases, the resistance 28 will increase to cause a greater amount of current to flow through the winding 24, thus to increase the field of the magnet 6 and affect the armature 12 to cause the pointer 8 to swing to the right to indicate increased temperatures. The variable resistance 28 may be material having a high temperature coefficient, such as nickel, iron, or any alloy or material with high temperature-resistance coefficient.

The winding 26 on the coil 6 being of sufficient strength to reduce the initial flux of the coil 6 to zero, magnet 4 will pull the pointer 8 to the zero position. If the reverse winding coil 26 were not used, the initial resistance of the resistance at 28 would be sufficiently large to enable the flux about the coil 6 to pull the pointer 8 to the right and prevent it from assuming its initial zero position at the extreme left.

Figure 1:
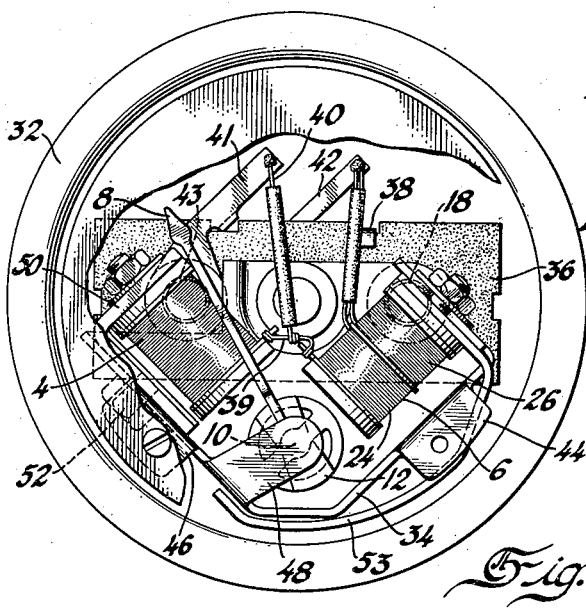
Figure 1 is an elevational view of the gauge with the dial broken away to show the construction.

Referring to Figure 1, the mechanical construction of the gauge is shown in greater detail. The gauge comprises the casing 32 which houses the frame 34. The frame is mounted on the insulating plate 36 which in turn has a metal grounding plate mounted on the bottom thereof, one of the tabs of the metal plate being indicated at 38. This metal plate is grounded against the casing 32 which in turn is grounded to the frame of the automobile to complete the circuit. The coils 4 and 6 are mounted on the frame 34, and coil 4 and coil 26 have one end of their windings connected to their coil cores which are electrically connected to the frame 34, which in turn is connected to the terminal 18, indicated in dotted outline at the right of the figure. The coil 6 consists of two separate windings 24 and 26, the coil 24 being insulated from the coil bobbin. The coil 4 and the winding 24 of the coil 6 have one of their ends or leads interconnected by a wire 39 which has a lead 40 to a tab or finger 41 connected to the resistance 28. From the resistance 28 the current returns to the battery through ground. The winding 26 and the other end of the winding 24 are connected to a tab or finger 42 which leads to ground 20. The coil 4 is adjustably mounted on the frame 34 by means of a metal angle member 50 and the machine screw 52. The coil 6 may, if desired, be similarly mounted. The frame 34 has the ears 44 and 46 on which the dial is mounted, and the third ear 48 to mount the pointer 8. A pole piece 53 is used to form a path for and to intensify the flux around the coil 6.

Figure 2:
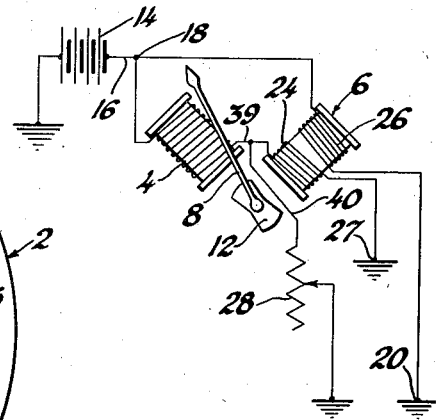
Figures 2 and 3 are optional circuits of the gauge.
Figure 3:
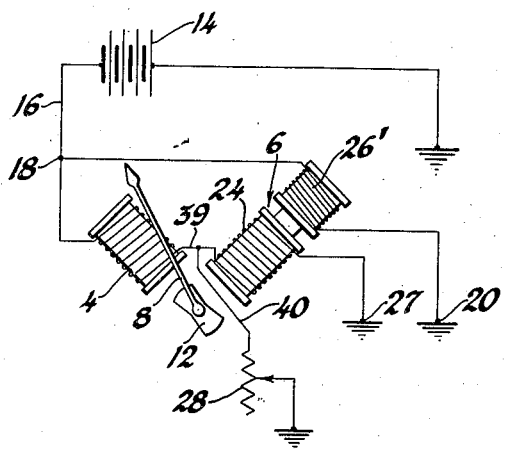

The structure of Figure 3 has the same circuit as Figure 2 and differs from the structure of the preceding Figures 1 and 2 in that the winding 26' is placed on a separate spool or core and is adjustably mounted at the end of the coil 24. By adjusting the spool toward or away from the coil 24 a position can be obtained where the initial flux of the electromagnet 6 is zero, which will enable the left hand magnet 4 to pull the pointer 8 to the position shown which is the zero position.

As the resistance at 28 increases with an increase in temperature, more current will flow through winding 24 thereby destroying the magnetic balance with winding 26' and causing the coil 6 to attract the pointer 8 and move it from left to right.

I claim:

1. In an electric gauge having two electromagnets mounted on a frame and arranged in fan shape and having a pointer adapted to move over a scale, said pointer being pivotally mounted at substantially the intersection of the axes of the electromagnets and having an armature mounted thereon, an opposed winding connected in parallel with one of the electromagnets and mounted coaxially therewith at times to reduce the field of its adjacent electromagnet to substantially zero to cause the other electromagnet to move the pointer to the zero position on the scale, said other electromagnet having at all times a substantially constant external resistance in series therewith.

2. In an electric gauge having two electromagnets arranged in fan shape and having a pointer adapted to move over a scale, said pointer being pivotally mounted at substantially the intersection of the axes of the electromagnets and having an armature mounted thereon, said electromagnets being connected in series, an opposed winding having its circuit free of resistance elements and connected in parallel with one of the electromagnets and positioned axially with reference thereto at times to reduce the field of its adjacent electromagnet to substantially zero to cause the other electromagnet to move the pointer to the zero position on the scale, said other electromagnet having at all times a substantially constant resistance in series therewith.

3. In an electric gauge having two electromagnets arranged in fan shape and with a pointer adapted to move over a scale and being pivotally mounted at substantially the axis of intersection of the center lines of the electromagnets, said pointer being at its zero position when there is substantially no field about one of the electromagnets, said gauge operating to cause the pointer to move across the scale when the resistance in the external circuit increases, means to cause the pointer to assume its zero position when the gauge is interposed in a circuit having a substantially constant initial external resistance, said means comprising a plurality of turns of wire wound about the said electromagnet having the zero field and creating a field opposite to the field of said electromagnet at times to neutralize the effect of the electromagnet and thereby to enable the other electromagnet to swing the pointer to its zero position.

4. In an electric gauge having two electromagnets arranged in fan shape and with a pointer adapted to move over a scale and being pivotally mounted at substantially the axis of intersection of the center lines of the electromagnets, said pointer being at its zero position when there is substantially no field about one of the electromagnets, said gauge operating to cause the pointer to move across the scale when the resistance in the external circuit increases, means to cause the pointer to assume its zero position when the gage is interposed in a circuit having a substantially constant initial external resistance, said means comprising a plurality of ampere turns of wire adjacent to and in axial alignment with said electromagnet having the zero field and creating a field opposite to the field of said electromagnet at times to neutralize the effect of the electromagnet and thereby to enable the field of the other electromagnet to swing the pointer to its zero position.

5. In an electric gauge having a right hand and a left hand electromagnet arranged in fan shape and with a pointer adapted to move over a scale and being pivotally mounted at substantially the axis of intersection of the center lines of the electromagnets, said pointer adapted to be at its zero position when there is substantially no field about the right hand magnet, said gauge operating to cause the pointer to move across the scale when the resistance in the external circuit increases, means to cause the pointer to assume its zero position when the gauge is interposed in a circuit having a substantially constant initial external resistance, said means comprising a plurality of turns of wire wound about the right-hand electromagnet and creating a field opposite to the field of said electromagnet at times to neutralize the effect of the electromagnet and thereby to enable the left-hand magnet to swing the pointer to its zero position.

6. In an electric gauge having a right-hand and a left-hand electromagnet arranged in fan shape and with a pointer adapted to move over a scale and being pivotally mounted at substantially the axis of intersection of the center lines of the electromagnets, said pointer adapted to be at its zero position when there is substantially no field about the right-hand magnet, said gauge operating to cause the pointer to move across the scale when the resistance in the external circuit increases, means to cause the pointer to assume its zero position when the gauge is interposed in a circuit having a substantially constant initial external resistance, said means comprising a plurality of ampere turns of wire adjacent to and in axial alignment with the right-hand electromagnet and creating a field opposite to the field of said electromagnet at times to neutralize the effect of the electromagnet and thereby to enable the field of the left-hand electromagnet to swing the pointer to its zero position.

ELBRIDGE F. BACON.